United States Patent
Machida

(10) Patent No.: US 8,405,682 B2
(45) Date of Patent: Mar. 26, 2013

(54) MOBILE COMMUNICATION DEVICE AND METHOD FOR SCALING DATA UP/DOWN ON TOUCH SCREEN

(75) Inventor: Satoshi Machida, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 740 days.

(21) Appl. No.: 12/493,457

(22) Filed: Jun. 29, 2009

(65) Prior Publication Data
US 2010/0141684 A1    Jun. 10, 2010

(30) Foreign Application Priority Data
Dec. 5, 2008    (JP) .................... 2008-311126

(51) Int. Cl.
*G09G 5/00*    (2006.01)
(52) U.S. Cl. ................... 345/661; 345/665
(58) Field of Classification Search ............. 345/661, 345/665
See application file for complete search history.

(56) References Cited

U.S. PATENT DOCUMENTS

| | | | |
|---|---|---|---|
| 2005/0267676 A1* | 12/2005 | Nezu et al. | 345/173 |
| 2009/0061948 A1* | 3/2009 | Lee et al. | 345/660 |
| 2009/0085936 A1* | 4/2009 | Chen et al. | 345/661 |
| 2009/0256947 A1* | 10/2009 | Ciurea et al. | 348/333.12 |
| 2009/0300554 A1* | 12/2009 | Kallinen | 715/863 |
| 2010/0020103 A1* | 1/2010 | Ure | 715/863 |
| 2010/0156806 A1* | 6/2010 | Stallings | 345/173 |
| 2010/0232704 A1* | 9/2010 | Thorn | 382/195 |
| 2010/0235786 A1* | 9/2010 | Maizels et al. | 715/863 |
| 2010/0315438 A1* | 12/2010 | Horodezky et al. | 345/661 |

FOREIGN PATENT DOCUMENTS

| | | |
|---|---|---|
| JP | 09-161088 A | 6/1997 |
| JP | 2000-206956 A | 7/2000 |
| JP | 2004-028678 A | 1/2004 |
| JP | 2007-274136 | * 10/2007 |
| JP | 2008-084144 | * 4/2008 |
| JP | 2008-113148 | * 5/2008 |

OTHER PUBLICATIONS

JP Office Action mailed on Jun. 5, 2012 as received in related application No. 2008-311126.

* cited by examiner

*Primary Examiner* — Jeffery A Brier
(74) *Attorney, Agent, or Firm* — Maschoff Brennan

(57) ABSTRACT

A mobile communication device having a touch screen, a detector and a controller is provided. The touch screen is adapted for displaying and entering data. The detector is configured to detect a trace drawn and entered on the touch screen. The controller is configured to scale up and to scale down data displayed on the touch screen depending on a direction of the trace.

13 Claims, 10 Drawing Sheets (Transferred from Fig. 4A)

(Transferred from Fig. 5A)

(Transferred from Fig. 7A)

(Transferred from Fig. 7B)

(Transferred from Fig. 9A)

(Transferred from Fig. 10A)

(Transferred from Fig. 12A)

(Transferred from Fig. 14A)

MOBILE COMMUNICATION DEVICE AND METHOD FOR SCALING DATA UP/DOWN ON TOUCH SCREEN

CROSS REFERENCE TO RELATED APPLICATIONS

This application is based upon and claims the benefit of priority from the prior Japanese Patent Application No. 2008-311126 filed on Dec. 5, 2008; the entire contents of which are incorporated herein by reference.

BACKGROUND OF THE INVENTION

1. Field of the Invention

The present invention relates to a mobile communication device and a method for scaling data up/down on a touch screen, and in particular to a mobile communication device having a touch screen for displaying and entering data.

2. Description of the Related Art

Unlike a desktop personal computer, a mobile communication device needs to downsize its main body for increasing portability. Accordingly, the mobile communication device needs to keep a balance between conflicting requirements for downsizing a key input system and for assuring certain operability. Thus, various technologies have been developed for increasing operability of key input operations of such kind of mobile communication device.

The above mobile communication device, however, has a key configuration for which neither a size of a user's hand, a position where the mobile communication device is held, nor a range in which the user can move his or her fingers are considered. The mobile communication device is so configured that every user operates the mobile communication device in accordance with a unique key configuration. Every user consequently has to operate the mobile communication device in a way adapted for the mobile communication device. Thus, there is a problem that some users feel the mobile communication device hard to be operated in some cases.

In order to address the above problem, a mobile communication device having a touch panel is disclosed in Japanese Patent Publication of Unexamined Applications (Kokai), No. 2008-113148 The mobile communication device of JP 2008-113148 is configured to display a group of operation keys and to be operated through a touch panel. The mobile communication device of JP 2008-113148 is so configured that a layout of the group of operation keys displayed on the touch panel can be set according to an individual user. The mobile communication device of JP 2008-113148 is configured to judge a position and an area where the group of operation keys is displayed on the basis of a user's operation of drawing a trace on the touch panel.

A mobile communication device having a touch screen for both displaying and entering data needs to display lots of data so as to be easily viewed by a user. Meanwhile, the mobile communication device needs to scale up and display respective items of the data so as to be easily operated by the user with his or her fingers.

Thus, a mobile communication device having a touch screen needs to be so configured that a user can easily change a method for displaying data to be displayed. Moreover, the mobile communication device needs to be easily operated by the user so as to scale displayed data up/down. In a case where the user wants to operate the mobile communication device one-handed, the mobile communication device needs to be so configured that the user can direct the mobile communication device to scale displayed data up/down by using only one of his or her fingers.

SUMMARY OF THE INVENTION

Accordingly, an advantage of the present invention is that a mobile communication device having a touch screen for both displaying and entering data and being configured to be easily operated by a user so as to scale displayed data up/down is provided.

To achieve the above advantage, one aspect of the present invention is to provide a mobile communication device having a touch screen, a detector and a controller is provided. The touch screen is adapted for displaying and entering data. The detector is configured to detect a trace drawn and entered on the touch screen. The controller is configured to scale up and to scale down data displayed on the touch screen depending on a direction of the trace.

DETAILED DESCRIPTION OF THE INVENTION

Figure 1:
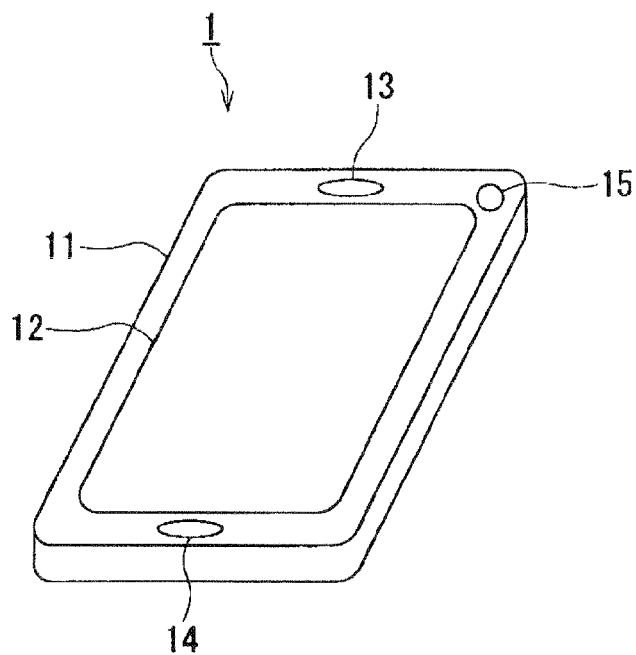
FIG. 1 is a perspective view showing a mobile communization device (mobile phone) of an embodiment of the present invention.

Hereinafter, embodiments of the present invention will be described in detail. In following descriptions, terms such as upper, lower, left, right, horizontal or vertical used while referring to a drawing shall be interpreted on a page of the drawing unless otherwise noted. Moreover, a same reference numeral given in no less than two drawings shall represent a same member or a same portion.

An embodiment of the present invention will be described with reference to FIGS. 1-14B. A card-shaped mobile phone 1 of the embodiment will be described as an example of the invention. FIG. 1 shows a perspective view of the mobile phone 1.

As shown in FIG. 1, the mobile phone 1 has a rectangular plate-like housing 11. The housing 11 is provided with a touch screen 12, a speaker 13, a microphone 14 and a power button 15. The touch screen 12 is configured to display a screen formed by text, an image and so on. The touch screen 12 is configured to sense a touch of a finger, a stylus and so on so that the mobile phone 1 can be provided with an instruction. The speaker 13 is configured to produce voice and sound. The microphone 14 can be used for entering voice and sound. The power button 15 can be pressed so as to turn on and off power supply to the mobile phone 1.

The touch screen 12 is a display having both a display function and an input function. That is, the touch screen 12 is configured to display a screen formed by text, an image and so on, and is configured to sense a touch of a finger, a dedicated stylus and so forth on its surface so that the mobile phone 1 can be provided with an instruction. The touch screen 12 is formed, e.g., by a plurality of elements arranged on a surface of the display for sensing a touch, and a transparent screen layered on top of the elements. The touch screen 12 may sense a touch by using a pressure sensing method for sensing a pressure change, or an electrostatic method for sensing an electrical signal caused by static electricity, or another method.

Figure 2:
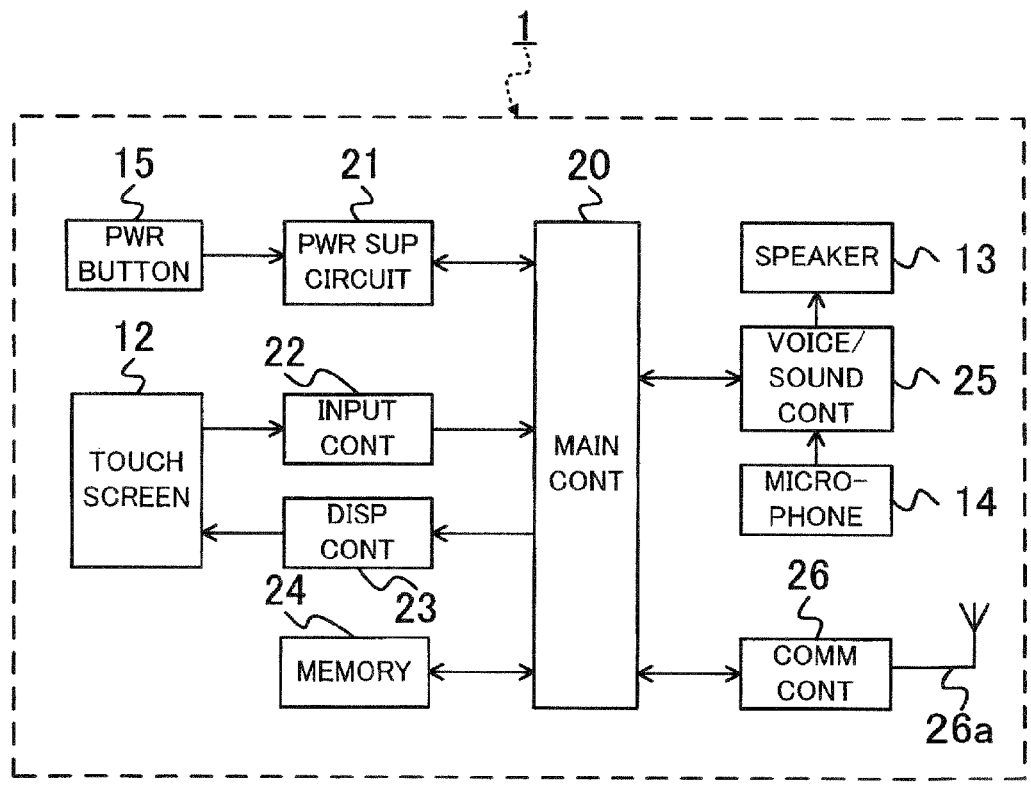
FIG. 2 is a block diagram of the mobile communization device (mobile phone) of the embodiment.
Figure 3:
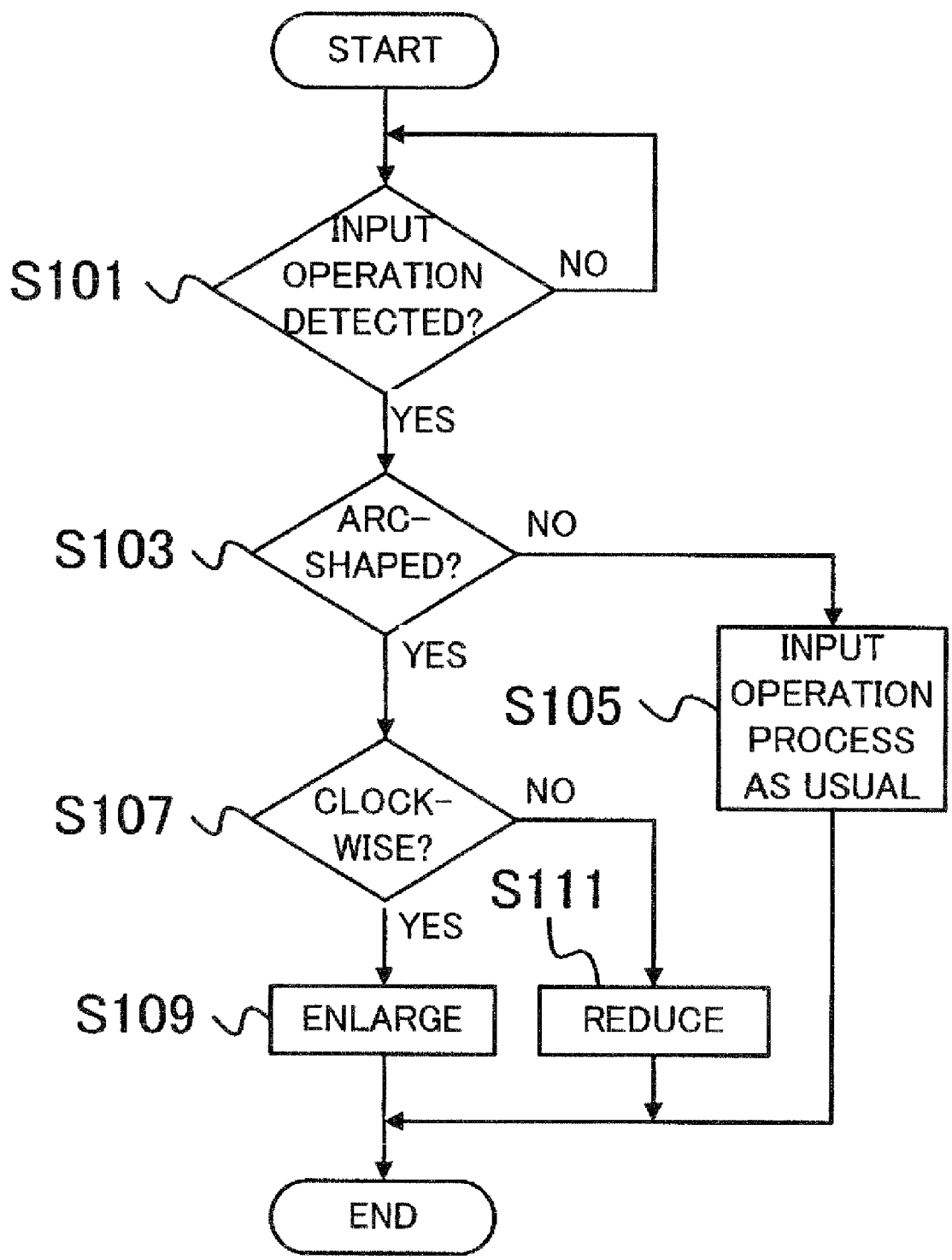
FIG. 3 is a flowchart showing a sequence of a first display control process that the mobile communization device (mobile phone) of the embodiment can perform.

FIG. 2 is a block diagram of the mobile phone 1. As shown in FIG. 2, the mobile phone 1 has a main controller 20, a power supply circuit 21, an input controller 22, a display controller 23, a memory 24, a voice/sound controller 25 and a communication controller 26 which are electrically connected to one another through a bus.

The main controller 20 has a CPU (central processing unit), and is configured to control the whole of the mobile phone 1. The main controller 20 is configured to perform a display control process that will be described later, other various arithmetic and control processes and so on. The power supply circuit 21 is configured to turn on and off the power supply on the basis of a user input through the power button 15. If the power supply is turned on, the power supply circuit 21 supplies each of portions of the mobile phone 1 with power from a power source contained in the mobile phone 1 (a battery and so on) or a power source connected from the outside, so as to activate the mobile phone 1.

The input controller 22 has an input interface to the touch screen 12. The input controller 22 is configured, e.g., to sense pressure applied to the touch screen 12, to generate a signal indicating a position at which the pressure is applied, and to send the signal to the main controller 20. Having received the signal, the main controller 20 performs a process in accordance with the signal. The display controller 23 has a display interface to the touch screen 12. The display controller 23 can be controlled by the main controller 20 so as to display a screen including text and an image.

The memory 24 is constituted by memory devices such as a ROM (read only memory), a hard disk, a non-volatile memory, a RAM (random access memory) and so on. The ROM is configured to store a program of a process performed by the main controller 20, data necessary for the process and so on. The RAM is configured to temporarily store data which the main controller 20 uses while performing the process. The memory 24 stores a program and data which the main controller 20 uses for the display control process.

The voice/sound controller 25 can be controlled by the main controller 20 so as to produce an analog voice signal from a voice input coming through the microphone 14 and to transform the analog voice signal into a digital voice signal. Moreover, upon obtaining a digital voice signal, the voice/sound controller 25 can be controlled by the main controller 20 so as to transform the digital voice signal into an analog voice signal, and to produce voice from the speaker 13.

The communication controller 26 can be controlled by the main controller 20 so as to de-spread a spread-spectrum signal received from a base station through the antenna 26a so as to restore data carried by the received signal. The communication controller 26 can be controlled by the main controller 20 so as to provide the data to the voice/sound controller 25 so that voice based on the data is produced through the speaker 13, to the display controller 23 so that the data is displayed on the touch screen 12, or to the memory 24 so that the data is stored in the memory 24. Moreover, upon obtaining a voice signal entered through the microphone 14, data entered through the touch screen 12 or data stored in the memory 24, the communication controller 26 performs a spectrum spreading process on those data signals and sends them to the base station through the antenna 26a.

If the mobile phone 1 displays data on the touch screen 12 in such a way that lots of data is intensively displayed on one screen at the same time, it may be conceivably difficult for a user to view respective items of the data. In such a case, the user may conceivably prefer to scale the displayed data up. If there is a limit to data to be displayed on the touch screen 12, or if respective items of the data are scaled up so as to enable the user to touch and select the items with his or her finger, it may be conceivably difficult for the user to view the whole of the screen. In such a case, the user may conceivably prefer to scale the displayed data down. Thus, the mobile phone 1 has a function for enabling a user to draw a trace (e.g., an arc-shaped line) on a screen displayed on the touch screen 12 so as to easily instruct the mobile phone 1 to scale displayed data up/down.

Assume that a user draws and enters an arc-shaped line on the touch screen 12 while the mobile phone 1 is displaying data on the touch screen 12. The main controller 20 is configured to perform a first display control process for scaling the displayed data up/down depending on the trace of the arc, and a sequence of the first display control process will be described with reference to a flowchart shown in FIG. 3. Assume that the mobile phone 1 scales displayed data up and down if the entered arc is clockwise and counterclockwise, respectively. Hereafter, a term such as "step S101" is shortened as "S101" by omitting the term "step".

While the mobile phone 1 is displaying some data on the touch screen 12, the user can draw an arc-shaped line on the touch screen 12 so as to instruct the mobile phone 1 to scale the displayed data up/down. Thus, while the mobile phone 1 is displaying some data on the touch screen 12, the main controller 20 judges whether an input operation is detected through the touch screen 12 (S101). If no input operation is detected ("No" of S101), the main controller 20 waits for an input operation to be detected through the touch screen 12.

If an input operation is detected through the touch screen 12 ("Yes" of S101), the main controller 20 judges whether an arc-shaped line has been drawn and entered (S103). At this moment, the main controller 20 judges that an arc-shaped line has been drawn and entered, e.g., in a case where an arc-shaped line that is as long as or longer than a certain length has been drawn on the touch screen 12. The main controller 20 may make the judgment at S103 in the middle of the input operation on the touch screen 12, and may make the judgment at S103 after the input operation on the touch screen 12 ends (i.e., a user's finger that has been in contact with the touch screen 12 is released from the touch screen 12) as well.

If no arc-shaped line is drawn and entered ("No" of S103), e.g., an input operation is detected at a point on the touch screen 12, the main controller 20 performs an input operation process as usual in accordance with that input operation (S105).

If an arc-shaped line is drawn and entered ("Yes" of S103), the main controller 20 determines that the user has instructed the mobile phone 1 to scale the displayed data up/down, and judges whether the entered arc-shaped line is clockwise (S107). If the entered arc-shaped line is clockwise ("Yes" of S107), the main controller 20 determines that the user has instructed the mobile phone 1 to scale the displayed data up, and scales up the data displayed on the touch screen 12 centered on a preset central point (S109). Where to locate the central point is optional. It is preferable that the central point is located at, although not limited to in particular, the gravity center of the displayed screen (that may include or exclude the top row or the bottom row thereof).

Figure 4A:
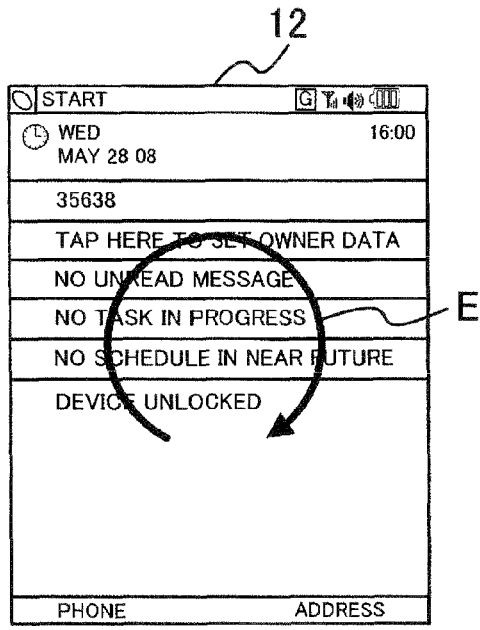
FIG. 4A shows a screen displayed on a touch screen of the mobile phone of the embodiment before a user draws and enters a clockwise arc on the touch screen in the first display control process.
Figure 4B:
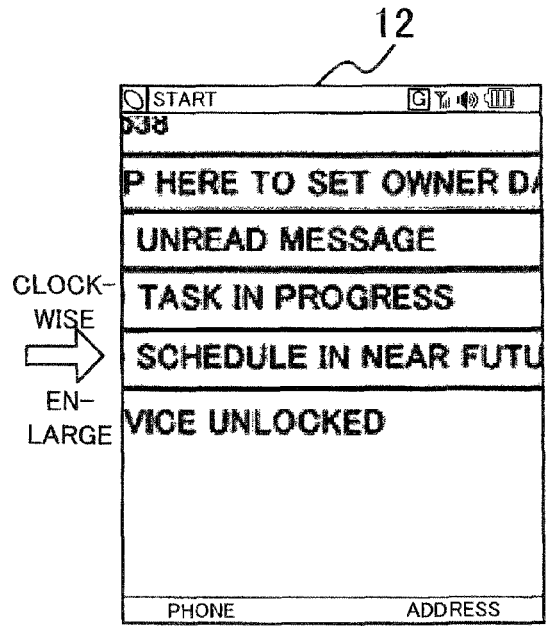
FIG. 4B shows a screen displayed on the touch screen after the user draws and enters the clockwise arc on the touch screen in the first display control process.

FIG. 4A shows a screen before a user draws and enters a clockwise arc E. FIG. 4B shows a screen after the user draws and enters the clockwise arc E. Assume, e.g., that the user draws and enters the clockwise arc E on the touch screen 12 while the mobile phone 1 is displaying some data on the touch screen 12 as shown in FIG. 4A. Then, as shown in FIG. 4B, the main controller 20 scales up the displayed data centered around the gravity center of the displayed screen by a given scale-up ratio.

Meanwhile, if the user draws and enters a counterclockwise arc ("No" of S107), the main controller 20 determines that the user has instructed the mobile phone 1 to scale the displayed data down, and scales down the data displayed on the touch screen 12 centered around a preset central point (S111). Where to locate the central point is optional. It is preferable that the central point is located at, although not limited to in particular, the gravity center of the displayed screen (that may include or exclude the top row or the bottom row thereof).

Figure 5A:
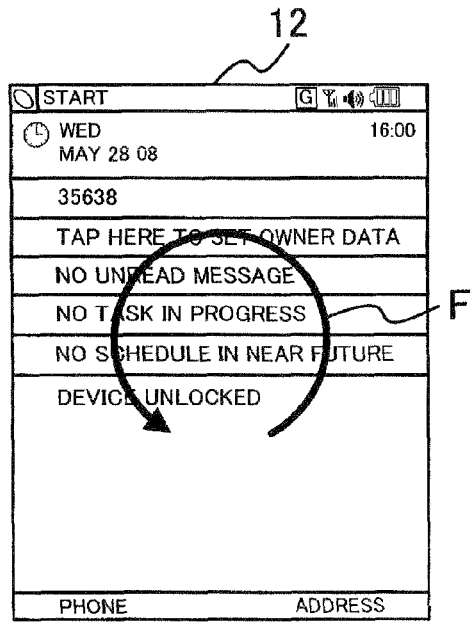
FIG. 5A shows a screen displayed on the touch screen of the mobile phone of the embodiment before a user draws and enters a counterclockwise arc on the touch screen in the first display control process.
Figure 5B:
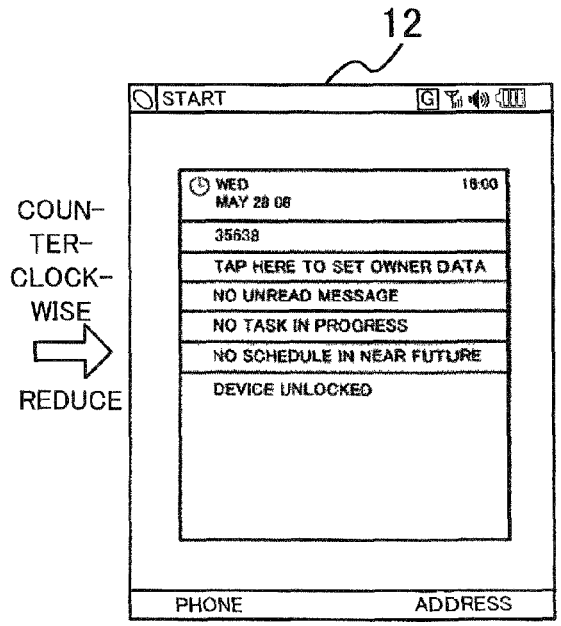
FIG. 5B shows a screen displayed on the touch screen after the user draws and enters the counterclockwise arc on the touch screen in the first display control process.
Figure 6:
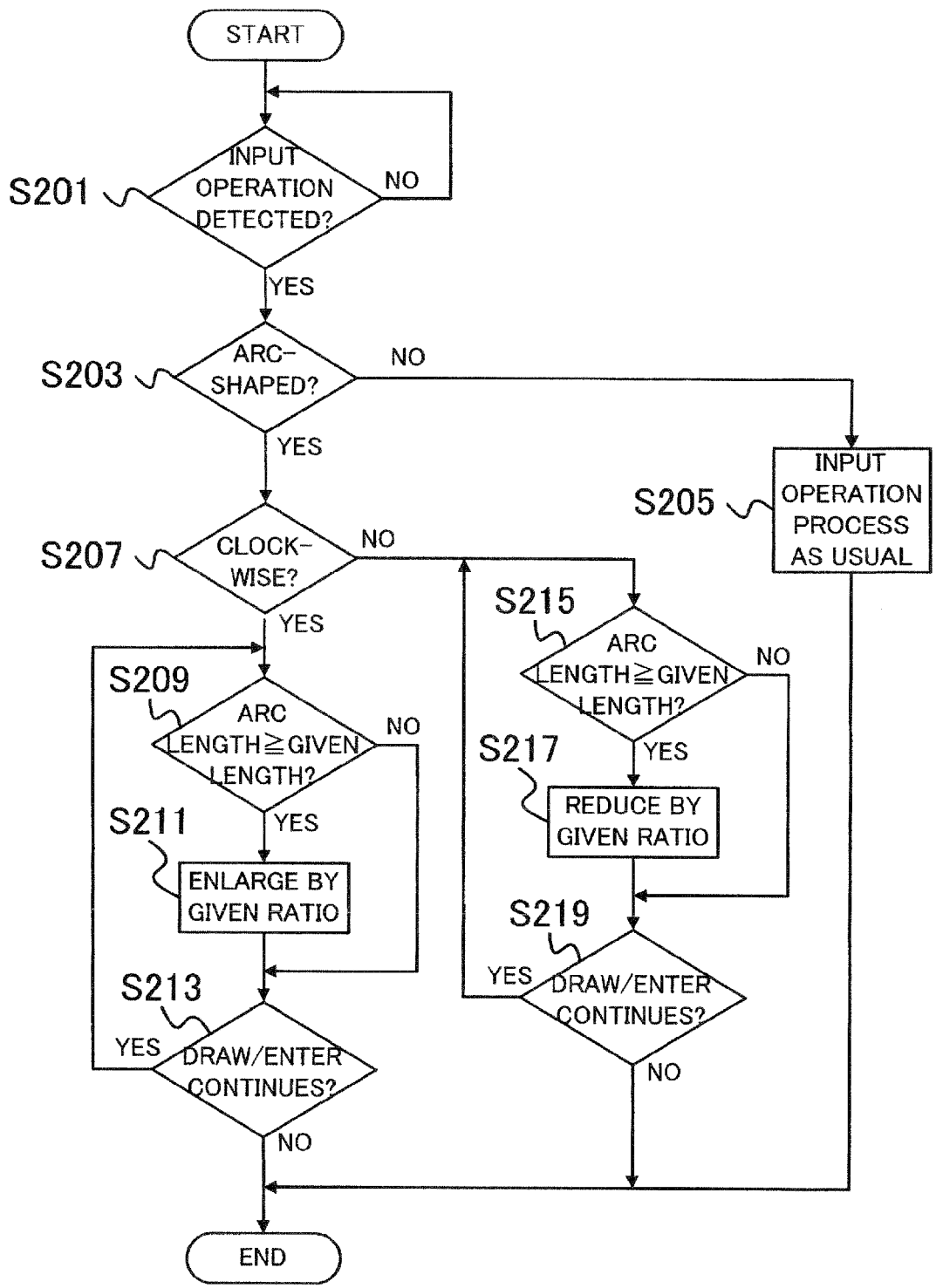
FIG. 6 is a flowchart showing a sequence of a second display control process that the mobile communization device (mobile phone) of the embodiment can perform.

FIG. 5A shows a screen before the user draws and enters a counterclockwise arc F. FIG. 5B shows a screen after the user draws and enters the counterclockwise arc F. Assume, e.g., that the user draws and enters the counterclockwise arc F on the touch screen 12 while the mobile phone 1 is displaying some data on the touch screen 12 as shown in FIG. 5A. Then, as shown in FIG. 5B, the main controller 20 scales the displayed data by a given scale-down ratio.

As described above, it is assumed that the mobile phone 1 scales displayed data up and down upon the user drawing a clockwise arc and a counterclockwise arc on the touch screen 12, respectively. The mobile phone 1 is not limited to the above, and the directions of the arcs (clockwise or counterclockwise) may be reversed. The mobile phone 1 may scale displayed data up/down upon a user drawing and entering an optionally-shaped line such as a straight line.

While displaying data on the touch screen 12, as described above, the mobile phone 1 can scale displayed data up/down in accordance with the directions of clockwise and counterclockwise arcs drawn on the touch screen 12, so as to provide a user-friendly interface. As the mobile phone 1 is configured to scale displayed data up/down in accordance with the directions of clockwise and counterclockwise arcs drawn on the touch screen 12, the user can draw a clockwise arc and a counterclockwise arc on the touch screen 12 while viewing the touch screen 12 so as to easily instruct the mobile phone 1 to scale displayed data up/down.

Assume that a user draws and enters an arc-shaped line on the touch screen 12 while the mobile phone 1 is displaying data on the touch screen 12. The mobile phone 1 is configured to perform a second display control process for scaling the displayed data up/down depending on the length of the entered line (or the degree of the central angle of the arc), and a sequence of the second display control process will be described with reference to a flowchart shown in FIG. 6. Hereafter, it is assumed that the mobile phone 1 scales the displayed data up and down if the entered arc is clockwise and counterclockwise, respectively.

While the mobile phone 1 is displaying data on the touch screen 12, a user can draw an arc-shaped line on the touch screen 12 and adjust the length of the line so as to instruct the mobile phone 1 to scale the displayed data up/down by a desired ratio. Thus, while the mobile phone 1 is displaying data on the touch screen 12, the main controller 20 judges whether an input operation is detected through the touch screen 12 (S201). If no input operation is detected ("No" of S201), the main controller 20 waits for an input operation to be detected through the touch screen 12.

If an input operation is detected through the touch screen 12 ("Yes" of S201), the main controller 20 judges whether an arc-shaped line has been drawn and entered (S203). At this moment, the main controller 20 judges that an arc-shaped line has been drawn and entered, e.g. in a case where an arc-shaped line drawing that is as long as or longer than a certain length is drawn. If no arc-shaped line is drawn and entered ("No" of S203), e.g., an input operation is detected at a point on the touch screen 12, the main controller 20 performs an input operation process as usual in accordance with that input operation (S205).

If an arc-shaped line is drawn and entered ("Yes" of S203), the main controller 20 judges whether the entered arc-shaped line is clockwise (S207). If the entered arc-shaped line is clockwise ("Yes" of S207), the main controller 20 judges whether the entered arc has a given length (or whether the central angle of the entered arc has a given degree) (S209).

If the user draws and enters an arc of the given length (or the central angle of the entered arc has the given degree) ("Yes" of S209), the main controller 20 determines that the user has instructed the mobile phone 1 to scale the displayed data up, and scales up the data displayed on the touch screen 12 centered around the gravity center of the displayed screen by a given scale-up ratio (S211).

Figure 7A:
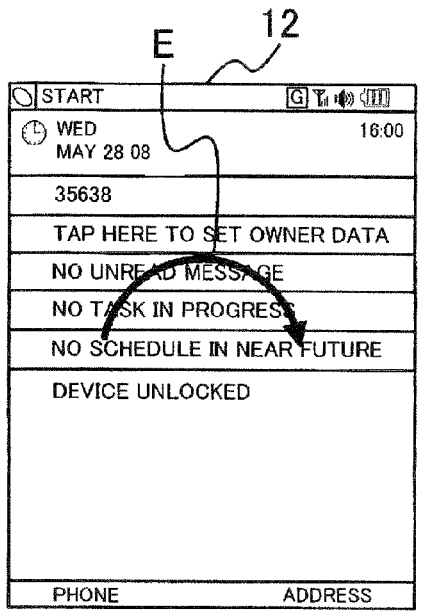
FIG. 7A shows a screen displayed on the touch screen before a user draws and enters a clockwise arc on the touch screen in the second display control process.
Figure 7B:
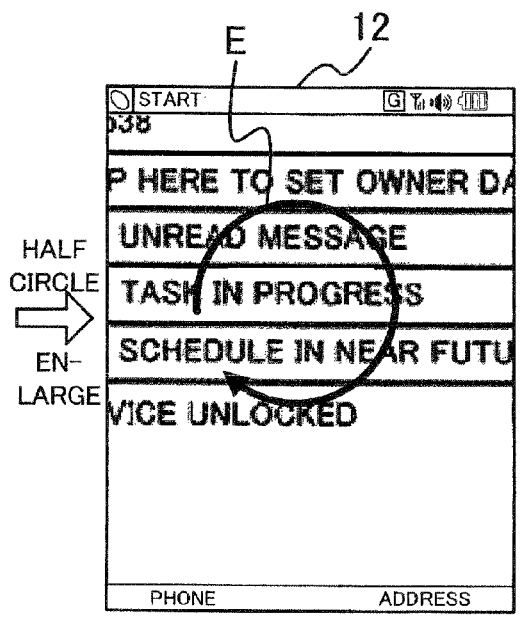
FIG. 7B shows a screen displayed on the touch screen after the user draws and enters the clockwise arc of a given length on the touch screen in the second display control process.
Figure 7C:
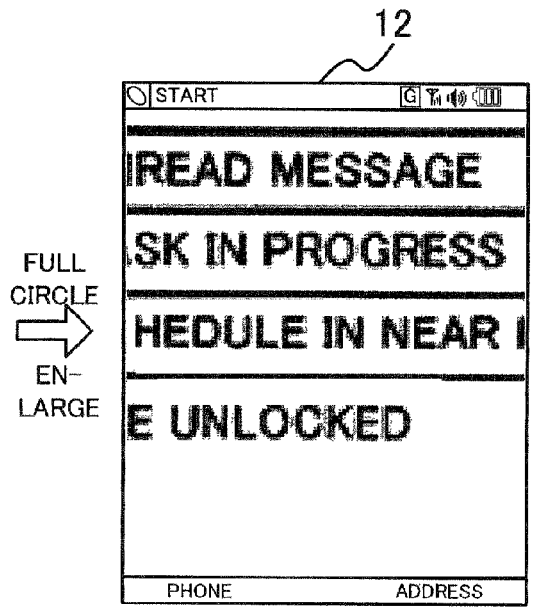
FIG. 7C shows a screen displayed on the touch screen after the user further and continuously draws and enters another clockwise arc of the given length in the second display control process.
Figure 8:
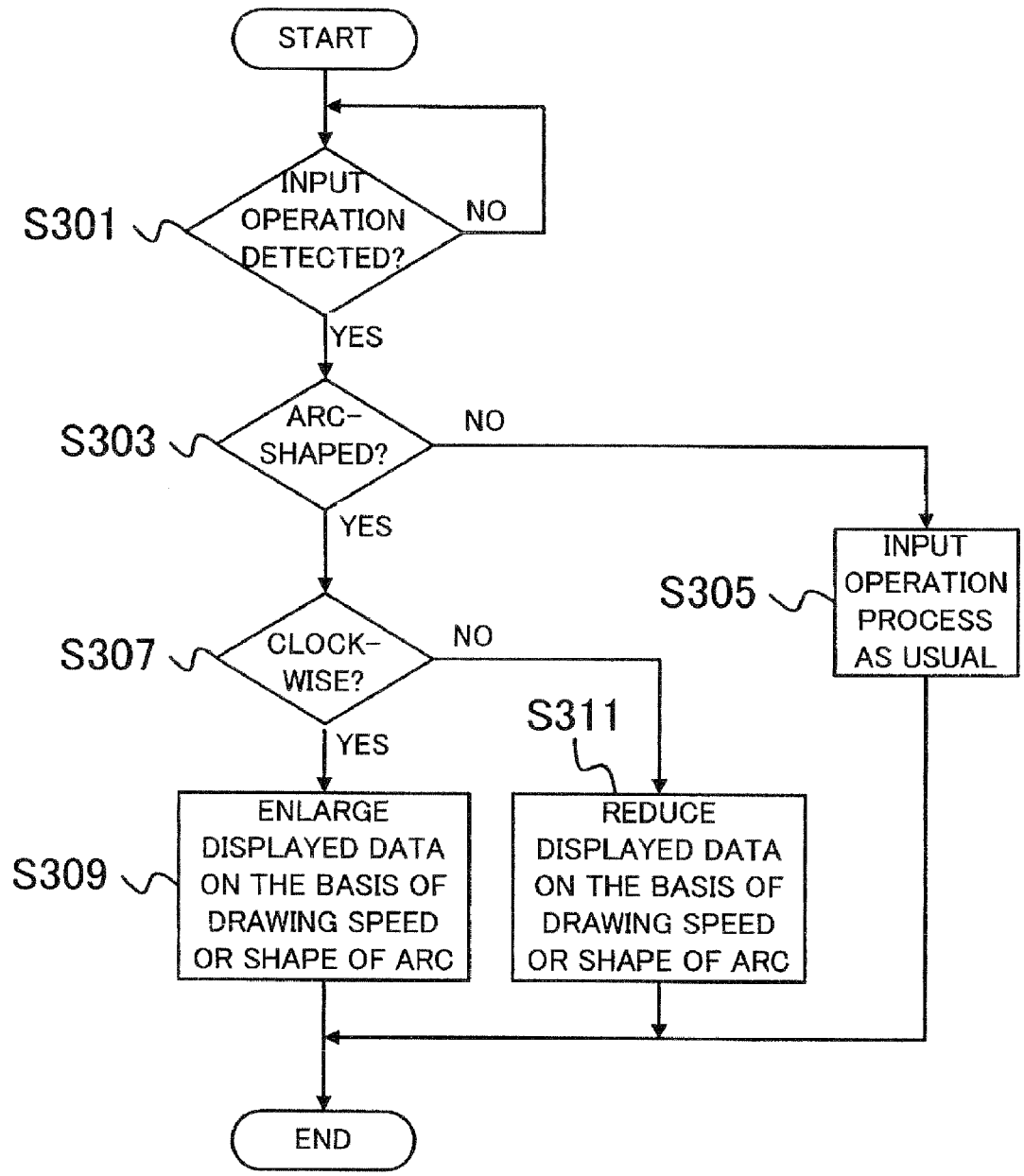
FIG. 8 is a flowchart showing a sequence of a third display control process that the mobile communization device (mobile phone) of the embodiment can perform.

FIG. 7A shows a screen before a user draws and enters a clockwise arc E. FIG. 7B shows a screen after the user draws and enters the clockwise arc E of a given length. FIG. 7C shows a screen after the user further and continuously draws and enters another clockwise arc E of the given length. Assume, e.g., that the user draws and enters the clockwise arc E that is a half circle (having a central angle of nearly 180 degrees) on the touch screen 12 while the mobile phone 1 is displaying data on the touch screen 12 as shown in FIG. 7A. Then, as shown in FIG. 7B, the main controller 20 scales up the displayed data centered around a preset central point by a given scale-up ratio (e.g., one and half times). Where to locate the central point is optional. It is preferable that the central point is located at, although not limited to in particular, the gravity center of the displayed screen (that may include or exclude the top row or the bottom row thereof).

After scaling the displayed data up at the step S211, or unless the user draws and enters an arc of the given length (or a given degree of the central angle) ("No" of S209), the main controller 20 judges whether the user continues drawing and entering the clockwise arc drawn at the step S203 (S213). If the user continues drawing and entering the clockwise arc ("Yes" of S213), the main controller 20 determines that the user continuously instructs the mobile phone 1 to scale the displayed data. Going back to the step S209, the main controller 20 judges whether the user further and continuously draws and enters the arc of the given length (S209).

If the user further and continuously draws the arc of the given length (or having the central angle of the given degree) ("Yes" of S209), the main controller 20 scales up the data displayed on the touch screen 12 by a certain scale-up ratio (S211) which is greater than the ratio previously used.

Assume, e.g., that a user draws and enters a clockwise arc E that is a full circle (having a central angle of nearly 360 degrees) on the touch screen 12 while, as shown in FIG. 7B, the mobile phone 1 is displaying data on the touch screen 12. Then, as shown in FIG. 7C, the main controller 20 scales the displayed data up by a certain scale-up ratio (e.g., twice).

Meanwhile, if a user draws and enters a counterclockwise arc ("No" of S207), the main controller 20 judges whether the user draws and enters an arc of a given length (or an arc having a central angle of a given degree) (S215). If the user draws and enters an arc of the given length (or an arc having a central angle of a given degree) ("Yes" of S215), the main controller 20 determines that the user has instructed the mobile phone 1 to scale the displayed data down, and scales down the data displayed on the touch screen 12 centered around the gravity center of the displayed screen by a given scale-down ratio (S217).

Assume, e.g., that a user draws and enters a counterclockwise arc that is a half circle (having a central angle of nearly 180 degrees) on the touch screen 12 while the mobile phone 1 is displaying data on the touch screen 12. Then, the main controller 20 scales the displayed data down by a given scale-down ratio (e.g., 0.7 times).

After scaling the displayed data down at the step S217, or unless the user draws and enters an arc of the given length (or an arc having a central angle of the given degree) ("No" of S215), the main controller 20 judges whether the user continues drawing and entering the counterclockwise arc drawn at the step S203 (S219). If the user continues drawing and entering the counterclockwise arc ("Yes" of S219), the main controller 20 determines that the user continuously instructs the mobile phone 1 to scale the displayed data down. Going back to the step S215, the main controller 20 judges whether the user further and continuously draws and enters an arc of the given length (S215).

If the user further and continuously draws and enters an arc of the given length (or an arc having a central angle of the given degree) ("Yes" of S215), the main controller 20 scales down the data displayed on the touch screen 12 centered around a preset central point by a certain reduction ratio (S217) which is smaller than the ratio previously used. Where to locate the central point is optional. It is preferable that the central point is located at, although not limited to in particular, the gravity center of the displayed screen (that may include or exclude the top row or the bottom row thereof).

Assume, e.g., that the user draws and enters a counterclockwise arc that is a full circle (having a central angle of nearly 360 degrees) on the touch screen 12 while the mobile phone 1 is displaying data on the touch screen 12. Then, the main controller 20 scales the displayed data down by a certain scale-down ratio (e.g., half).

Unless the user continues drawing and entering the clockwise arc ("No" of S213), or unless the user continues drawing and entering the counterclockwise arc ("No" of S219), the main controller 20 determines that the user finishes instructing the mobile phone 1 to scale the displayed data up/down, and finishes the second display control process.

As described above, while displaying data on the touch screen 12, the mobile phone 1 allows a user to draw and enter a clockwise or counterclockwise arc on the touch screen 12. Every time the user draws and enters an arc of a given length (or of a given central angle), the mobile phone 1 can scale the displayed data up/down, so that a user-friendly interface can be provided. As the mobile phone 1 is configured to determine a scale-up or scale-down ratio depending on the length (or the central angle) of the entered arc, the user can draw an arc on the touch screen 12 while viewing the touch screen 12 so as to instruct the mobile phone 1 to scale the displayed data up/down, and can adjust scale-up/down ratios for scaling the displayed data up/down.

Assume that a user draws and enters an arc-shaped line on the touch screen 12 while the mobile phone 1 is displaying data on the touch screen 12. The mobile phone 1 is configured to perform a third display control process for scaling the displayed data up/down depending on the drawing speed or the shape of the line, and a sequence of the third display control process will be described with reference to a flowchart shown in FIG. 8. Hereafter, it is assumed that the mobile phone 1 scales displayed data up and down if the entered arc is clockwise and counterclockwise, respectively.

While the mobile phone 1 is displaying data on the touch screen 12, the user can draw an arc-shaped line on the touch screen 12 so as to instruct the mobile phone 1 to scale the displayed data up/down. Thus, while the mobile phone 1 is displaying data on the touch screen 12, the main controller 20 judges whether an input operation is detected through the touch screen 12 (S301). If no input operation is detected ("No" of S301), the main controller 20 waits for an input operation to be detected through the touch screen 12.

If an input operation is detected through the touch screen 12 ("Yes" of S301), the main controller 20 judges whether an arc-shaped line has been drawn and entered (S303). At this moment, the main controller 20 judges that an arc-shaped line has been drawn, e.g., in a case where an arc-shaped line that is as long as or longer than a certain length is drawn. The main controller 20 may make the judgment at S303 in the middle of the input operation on the touch screen 12, and may make the judgment at S303 after the input operation on the touch screen 12 ends (i.e., a user's finger that has been in contact with the touch screen 12 is released from the touch screen 12) as well.

If no arc-shaped line is drawn and entered ("No" of S303), e.g., an input operation is detected at a point on the touch screen 12, the main controller 20 performs an input operation process as usual in accordance with that input operation (S305).

If an arc-shaped line is drawn and entered ("Yes" of S303), the main controller 20 judges whether the entered arc is clockwise (S307). If the entered arc is clockwise ("Yes" of S307), the main controller 20 scales up the data displayed on the touch screen 12 depending on the drawing speed or the shape (or, e.g., the size) of the entered arc (S309). The main controller 20 can calculate the drawing speed of the arc, e.g., on the basis of the number of dots entered within a given period of time. The main controller 20 can calculate the size of the arc, e.g., on the basis of the curvature radius of the arc.

Figure 9A:
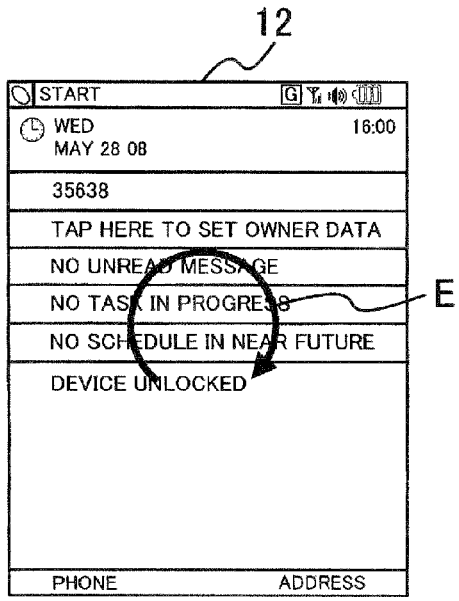
FIG. 9A shows a screen displayed on the touch screen before a user draws and enters a relatively small clockwise arc on the touch screen in the third display control process.
Figure 9B:
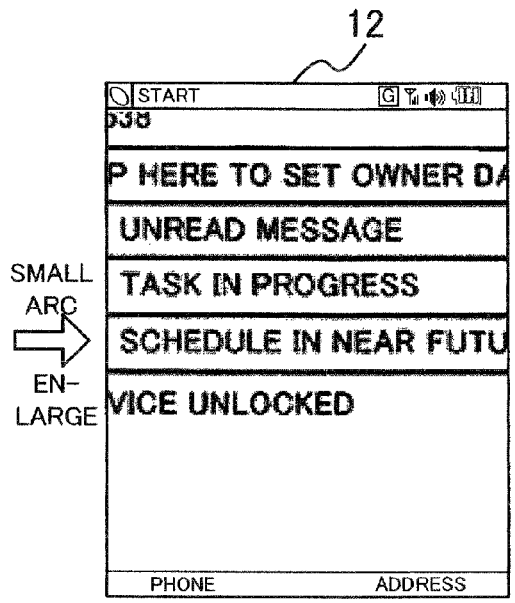
FIG. 9B shows a screen displayed on the touch screen after the user draws and enters the relatively small clockwise arc on the touch screen in the third display control process.

FIG. 9A shows a screen before a user draws and enters a relatively small clockwise arc E. FIG. 4B shows a screen after the user draws and enters the relatively small clockwise arc E. Assume that the main controller 20 scales the displayed data up depending on the shape of the entered arc, and that, e.g., the user draws and enters the clockwise arc E on the touch screen 12 while the mobile phone 1 is displaying data on the touch screen 12 as shown in FIG. 9A. Then, as shown in FIG. 9B, the main controller 20 scales the displayed data up by a given scale-up ratio.

The main controller 20 scales up and down displayed data centered on a preset central point at S309 and at S311, respectively. Where to locate the central point is optional. It is preferable that the central point is located at, although not limited to in particular, the gravity center of the displayed screen (that may include or exclude the top row or the bottom row thereof).

Figure 10A:
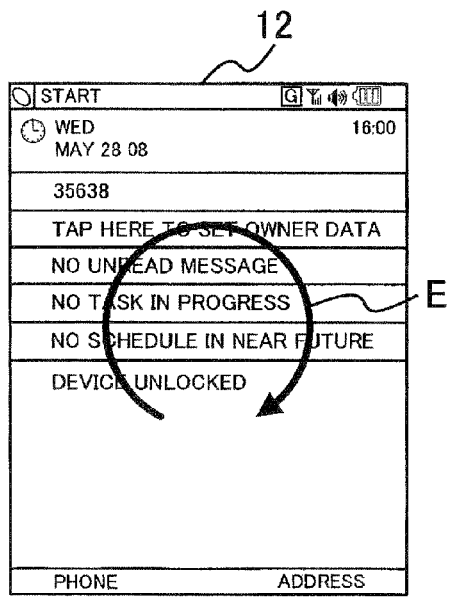
FIG. 10A shows a screen displayed on the touch screen before the user draws and enters a relatively large clockwise arc on the touch screen in the third display control process.
Figure 10B:
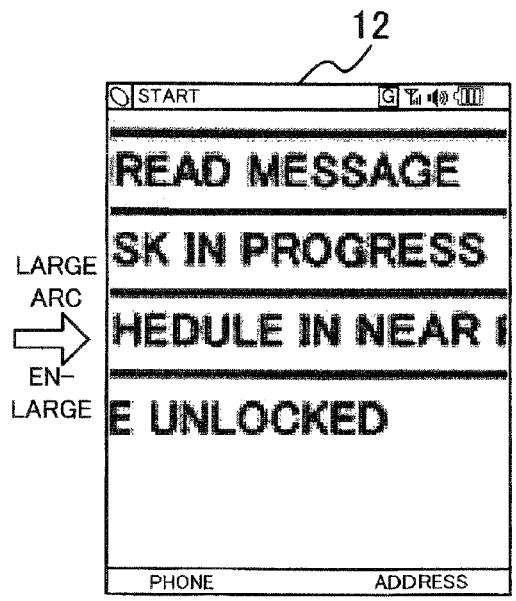
FIG. 10B shows a screen displayed on the touch screen after the user draws and enters the relatively large clockwise arc on the touch screen in the third display control process.
Figure 11:
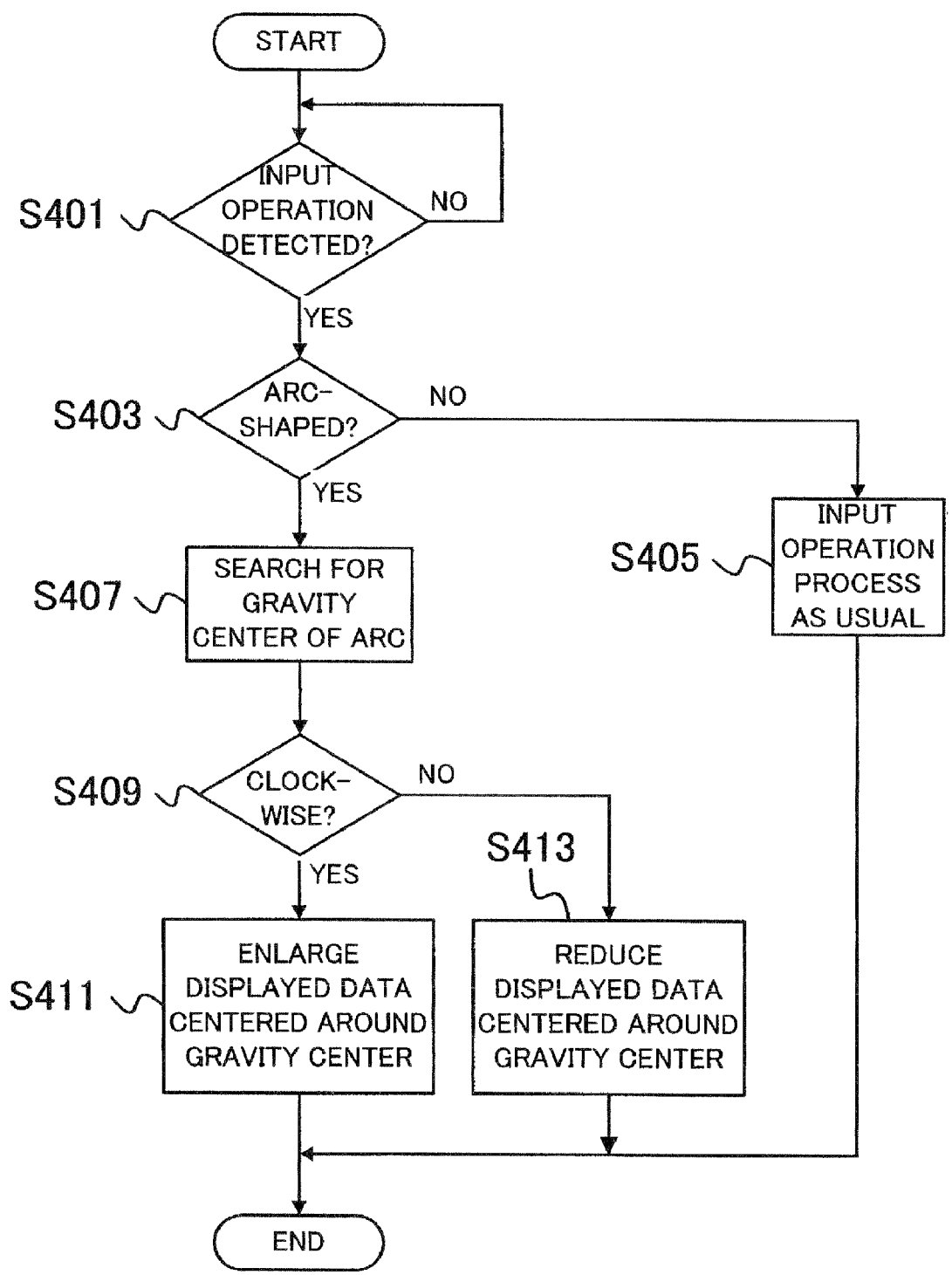
FIG. 11 is a flowchart showing a sequence of a fourth display control process that the mobile communization device (mobile phone) of the embodiment can perform.

FIG. 10A shows a screen before the user draws and enters a relatively large clockwise arc E. FIG. 4B shows a screen after the user draws and enters the relatively large clockwise arc E. Assume, e.g., that the user draws and enters a clockwise arc E that is greater than the arc shown in FIG. 9A on the touch screen 12 while the mobile phone 1 is displaying data on the touch screen 12 as shown in FIG. 10A. Then, as shown in FIG. 10B, the main controller 20 scales the displayed data up by a scale-up ratio that is greater than the scale-up ratio shown in FIG. 9B.

Assume that the main controller 20 scales the displayed data up depending on the drawing speed of the arc. If the user quickly draws a clockwise arc on the touch screen 12 while the mobile phone 1 is displaying data on the touch screen 12, the main controller 20 should scale the displayed data up by a scale-up ratio that is greater than that in a case where the user slowly draws an arc.

Meanwhile, if the entered arc is counterclockwise ("No" of S307), the main controller 20 scales down the data displayed on the touch screen 12 depending on the drawing speed of the arc or the shape (or, e.g., the size) of the entered arc (S311) similarly as at the step S309.

As described above, while displaying data on the touch screen 12, the mobile phone 1 allows a user to draw and enter a clockwise or counterclockwise arc on the touch screen 12. The mobile phone 1 can determine a scale-up/down ratio depending on the drawing speed of the arc, and can scale the displayed data up/down by the determined ratio so as to provide a user-friendly interface. As the mobile phone 1 is configured to determine a scale-up/down ratio depending on the drawing speed of the entered arc, the user can draw a clockwise or counterclockwise arc on the touch screen 12 while viewing the touch screen 12 so as to instruct the mobile phone 1 to scale displayed data up/down, and can adjust the drawing speed of the arc so as to adjust scale-up/down ratios for scaling the displayed data up/down.

As described above, while displaying data on the touch screen 12, the mobile phone 1 allows a user to draw and enter a clockwise or counterclockwise arc on the touch screen 12. The mobile phone 1 can determine a scale-up/down ratio depending on the shape (or, e.g., the size) of the arc, and can scale the displayed data up/down by the determined ratio so as to provide a user-friendly interface. As the mobile phone 1 is configured to determine scale-up/down ratio depending on the shape of the entered arc, the user can draw a clockwise or counterclockwise arc on the touch screen 12 while viewing the touch screen 12 so as to instruct the mobile phone 1 to scale displayed data up/down, and can adjust the size of the arc so as to adjust a scale-up/down ratio for scaling the displayed data up/down.

Assume that a user draws and enters an arc-shaped line on the touch screen 12 while the mobile phone 1 is displaying data on the touch screen 12. The mobile phone 1 is configured to perform a fourth display control process for scaling the displayed data up/down while taking the position of the gravity center of the arc into account, and a sequence of the fourth display control process will be described with reference to a flowchart shown in FIG. 11. Hereafter, it is assumed that the mobile phone 1 scales displayed data up and down if the entered arc is clockwise and counterclockwise, respectively.

While the mobile phone 1 is displaying data on the touch screen 12, the user can draw an arc-shaped line on the touch screen 12 so as to instruct the mobile phone 1 to scale the displayed data up/down. Thus, while the mobile phone 1 is displaying data on the touch screen 12, the main controller 20 judges whether an input operation is detected through the touch screen 12 (S401). If no input operation is detected ("No" of S401), the main controller 20 waits for an input operation to be detected through the touch screen 12.

If an input operation is detected through the touch screen 12 ("Yes" of S401), the main controller 20 judges whether an arc-shaped line is drawn and entered (S403). At this moment, the main controller 20 judges that an arc-shaped line has been drawn, e.g., in a case where an arc-shaped line that is as long as or longer than a certain length has been drawn. Although the main controller 20 may make the judgment at S403 in the middle of the input operation on the touch screen 12, it is preferable that the main controller 20 make the judgment at S403 after the input operation on the touch screen 12 ends (i.e., a user's finger that has been in contact with the touch screen 12 is released from the touch screen 12).

If no arc-shaped line is drawn and entered ("No" of S403), e.g., an input operation is detected at a point on the touch screen 12, the main controller 20 performs an input operation process as usual in accordance with that input operation (S405).

If an arc-shaped line is drawn and entered ("Yes" of S403), the main controller 20 searches for the position of the gravity center of the entered arc (S407). At this moment, the main controller 20 calculates the position of the gravity center on the basis of coordinates, the curvature, the curvature radius and so on of the entered arc.

The main controller 20 judges whether the entered arc-shaped line is clockwise (S409). If the entered arc is clockwise ("Yes" of S409), the main controller 20 moves the data displayed on the touch screen 12 so that the gravity center that has been searched for at step S407 comes to the center, and scales the displayed data up (S411).

Figure 12A:
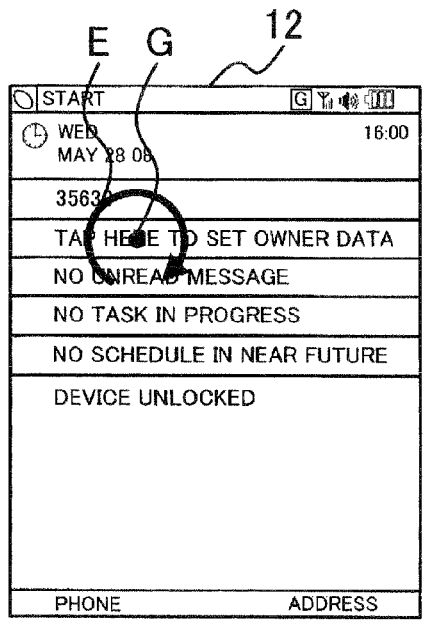
FIG. 12A shows a screen displayed on the touch screen before a user draws and enters a clockwise arc on the touch screen in the fourth display control process.
Figure 12B:
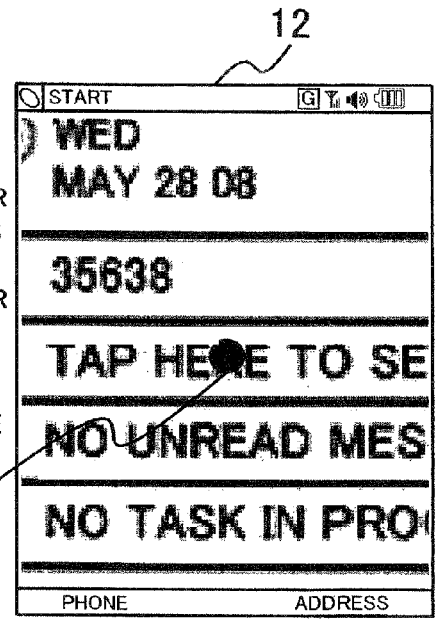
FIG. 12B shows a screen displayed on the touch screen after the user draws and enters the clockwise arc on the touch screen in the fourth display control process.
Figure 13:
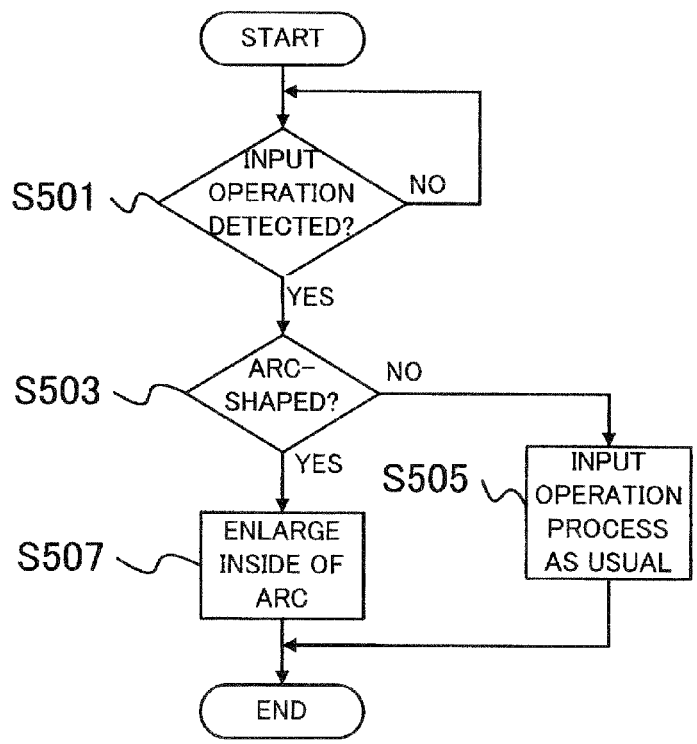
FIG. 13 is a flowchart showing a sequence of a fifth display control process that the mobile communization device (mobile phone) of the embodiment can perform.

FIG. 12A shows a screen before a user draws and enters a clockwise arc E. FIG. 12B shows a screen after the user draws and enters the clockwise arc E. Assume, e.g., that the user draws and enters the clockwise arc E that has a gravity center G on the touch screen 12 while the mobile phone 1 is displaying data on the touch screen 12 as shown in FIG. 12A. Then, as shown in FIG. 12B, the main controller 20 moves the displayed data so that the gravity center G comes to the center of the screen, and scales the displayed data up by a given scale-up ratio.

Meanwhile, if the user draws and enters a counterclockwise arc ("No" of S409), the main controller 20 moves the displayed data so that the gravity center G that has been searched for at the step S407 comes to the center of the screen, and scales the displayed data down (S413).

As described above, while displaying data on the touch screen 12, the mobile phone 1 allows a user to draw and enter a clockwise or counterclockwise arc on the touch screen 12. The mobile phone 1 can move displayed data so that the gravity center of the arc comes to the center of the screen, and can scale the displayed data up/down so as to provide a user-friendly interface. As the mobile phone 1 is configured to scale displayed data up/down while taking the position of the gravity center of the entered arc into account, the user can draw an arc while viewing the touch screen 12 so as to instruct the mobile phone 1 to scale the displayed data up/down, and can select a position at which the arc is drawn so as to adjust a central position for scaling the displayed data up/down.

Assume that a user draws and enters an arc-shaped line on the touch screen 12 while the mobile phone 1 is displaying data on the touch screen 12. The mobile phone 1 is configured to perform a fifth display control process for scaling up data displayed inside the arc, and a sequence of the fifth display control process will be described with reference to a flowchart shown in FIG. 13.

While the mobile phone 1 is displaying data on the touch screen 12, a user can draw an arc-shaped line on the touch screen 12 so as to instruct the mobile phone 1 to scale the displayed data up/down. Thus, while the mobile phone 1 is displaying data on the touch screen 12, the main controller 20 judges whether an input operation is detected through the touch screen 12 (S501). If no input operation is detected ("No" of S501), the main controller 20 waits for an input operation to be detected through the touch screen 12.

If an input operation is detected through the touch screen 12 ("Yes" of S501), the main controller 20 judges whether an arc-shaped line has been drawn and entered (S503). At this moment, the main controller 20 judges that an arc-shaped line has been drawn, e.g., in a case where an arc-shaped line that is as long as or longer than a certain length is drawn. If no arc-shaped line is drawn and entered ("No" of S503), e.g., an input operation is detected at a point on the touch screen 12, the main controller 20 performs an input operation process as usual in accordance with that input operation (S505).

If an arc-shaped line is drawn and entered ("Yes" of S503), the main controller 20 scales up a portion of the data displayed on the touch screen 12 surrounded by the arc, and displays scaled-up data inside the arc (S507).

Figure 14A:
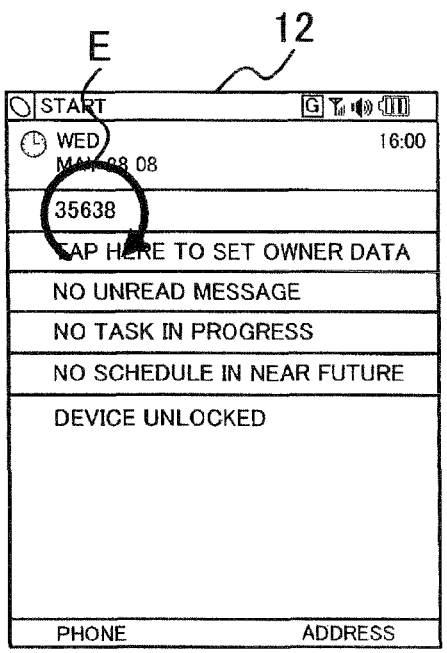
FIG. 14A shows a screen displayed on the touch screen before a user draws and enters a clockwise arc on the touch screen in the fifth display control process.
Figure 14B:
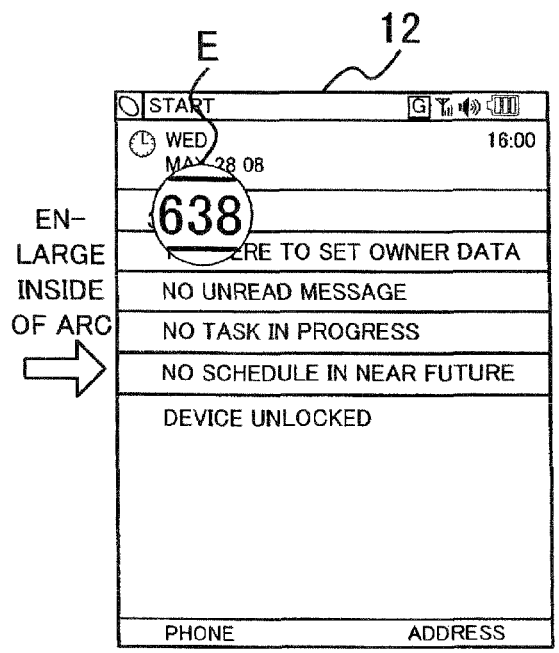
FIG. 14B shows a screen displayed on the touch screen after the user draws and enters the clockwise arc on the touch screen in the fifth display control process.

FIG. 14A shows a screen before a user draws and enters a clockwise arc E. FIG. 14B shows a screen after the user draws and enters the clockwise arc E. Assume, e.g., that the user draws and enters the clockwise arc E on the touch screen 12 while the mobile phone 1 is displaying data on the touch screen 12 as shown in FIG. 14A. Then, as shown in FIG. 14B, the main controller 20 scales up the data displayed inside the arc by a given scale-up ratio, and displays the scaled-up data inside the arc.

As described above, while displaying some on the touch screen 12, the mobile phone 1 allows a user to draw and enter an arc and so forth on the touch screen 12. Then, the mobile phone 1 can scale up the data displayed inside the entered arc on the basis of the input of the arc, so as to provide a user-friendly interface. As the data displayed inside the entered arc can be scaled up on the basis of the input of the arc, a user who wants to scale up a portion of a screen that the user is viewing can easily instruct the mobile phone 1 to scale the portion to be scaled-up by drawing and entering an arc at that portion on the touch screen 12.

Assume that the mobile phone 1 can be changeably set to a mode which allows scrolling and to a mode which does not allow scrolling. In such a case, it is preferable that the mobile phone 1 performs the fifth display control process of scaling displayed data up/down as described above upon being set to the mode which does not allow scrolling. Upon being set to the mode which allows scrolling, the mobile phone 1 can scroll displayed data in accordance with a linear trace drawn and entered on the touch screen 12.

In a case where the mobile phone 1 scales displayed data up/down on the touch screen 12, the mobile phone 1 can combine and perform in parallel two or more of the processes described above, such as the process for determining a scale-up/down ratio depending on the drawing speed or the shape of the arc at the steps S301-S311, the process for determining a center of a scaled-up display or a scaled-down display while taking the position of the gravity center of the arc into account at the steps S401-S413, and so on.

In a case where the mobile phone 1 scales displayed data up/down on the touch screen 12, if a user draws and enters an arc and changes the direction of the arc from clockwise to counterclockwise and vice versa while continuing drawing the arc, the mobile phone 1 can change from a scaled-up display to a scaled-down display and vice versa as required.

The mobile communication device of the present invention described above (the mobile phone 1) has a touch screen 12 for both displaying and entering data. If a user draws and enters an arc-shaped line on the touch screen 12, the mobile phone 1 can scale displayed data up/down depending on the shape of the arc and so on, so that the user can easily operate the mobile phone 1 for scaling the displayed data up/down.

The mobile phone 1 has been explained as a mobile communication device of the present invention, which is not limited to the mobile phone 1 though, and can be any kind of portable device having a touch screen such as a PHS (personal handy phone system) device, a PDA (personal digital assistant), a portable music player, a portable game machine and so on.

What is claimed is:
1. A mobile communication device, comprising:
    a touch screen adapted for displaying and entering data;
    a detector configured to detect an arc from an arc-shaped line drawn and entered on the touch screen; and
    a controller configured to scale up or down data displayed on the touch screen depending on a direction of the arc detected by the detector, wherein the controller is configured to scale up the data displayed on the touch screen when the direction of the arc is one of clockwise and counterclockwise directions, and to scale down the data displayed on the touch screen when the direction of the arc is the other of clockwise and counterclockwise directions; and the controller is further configured to adjust a ratio of the scaling of the data on the touch screen depending on the length of the arc.

2. The mobile communication device of claim 1, wherein the controller is further configured to calculate a gravity center of the arc detected by the detector, the controller being further configured to move the data displayed on the touch screen in such a way that the calculated gravity center comes to the center of a screen displayed on the touch screen.

3. The mobile communication device of claim 1, wherein the controller is further configured to scale up a portion of the data surrounded by the arc detected by the detector, the controller being further configured to display the scaled-up portion of the data within the arc.

4. The mobile communication device of claim 1, wherein the controller is further configured to adjust a ratio by which the controller scales up or down the data displayed on the touch screen depending on a characteristic of the arc.

5. The mobile communication device of claim 1, wherein the controller is configured to scale up and down the data displayed on the touch screen when the arc is in the one and the other of clockwise and counterclockwise directions, respectively, the controller being further configured to adjust a ratio by which the controller scales up or down the data displayed on the touch screen depending on a characteristic of the arc.

6. The mobile communication device of claim 1, wherein the controller is further configured to adjust a ratio by which the controller scales up or down the data displayed on the touch screen depending on a degree of the central angle of the arc detected by the detector.

7. The mobile communication device of claim 1, wherein the controller is further configured to calculate drawing speed of the arc, the controller being further configured to adjust a ratio by which the controller scales up or down the data displayed on the touch screen depending on the calculated drawing speed of the arc.

8. The mobile communication device of claim 1, wherein the controller is further configured to calculate a curvature radius of the arc detected by the detector, controller being further configured to adjust a ratio by which the controller scales up or down the data displayed on the touch screen depending on the calculated curvature radius.

9. The mobile communication device of claim 1, wherein the controller is further configured to calculate a gravity center of the arc detected by the detector, the controller being further configured to move the data displayed on the touch screen in such a way that the calculated gravity center comes to the center of a screen displayed on the touch screen, the controller being further configured to adjust a ratio of the scaling of the data on the touch screen depending on a characteristic of the arc.

10. The mobile communication device of claim 1, wherein the controller is further configured to scale up a portion of the data surrounded by the arc detected by the detector, the controller being further configured to display the scaled-up portion of the data within the arc.

11. A method for scaling up or down data displayed on a touch screen, comprising:

detecting an arc from an arc-shaped line drawn and entered on the touch screen; and either scaling up or scaling down data displayed on the touch screen depending on a direction of the arc detected by the detector, wherein the data displayed on the touch screen is scaled up when the direction of the arc is one of clockwise and counterclockwise directions, and wherein the data displayed on the touch screen is scaled down when the direction of the arc is the other of the clockwise and counterclockwise directions, and wherein a ratio of the scaling of the data on the touch screen depends on a length of the arc.

12. The method for scaling up or down the data displayed on the touch screen of claim 11, further comprising adjusting a ratio by which the data displayed on the touch screen is scaled up or down depending on a characteristic of the arc.

13. The method for scaling up or down the data displayed on the touch screen of claim 11, further comprising adjusting a ratio by which the data displayed on the touch screen is scaled up or down depending on another characteristic of the arc, wherein the data is scaled up and down when the arc is in the one and the other of clockwise and counterclockwise directions, respectively.

* * * * *